(12) United States Patent
Chang et al.

(10) Patent No.: US 12,446,538 B2
(45) Date of Patent: Oct. 21, 2025

(54) APPARATUS AND A METHOD FOR SIMULATING ONE OR MORE ECO HABITAT CONDITIONS

(71) Applicants: Pak Chuen Chang, Muar (MY); Ryan You Wen Boey, Singapore (SG); Paulina Li Mei Chang, Singapore (SG)

(72) Inventors: Pak Chuen Chang, Muar (MY); Ryan You Wen Boey, Singapore (SG); Paulina Li Mei Chang, Singapore (SG)

(73) Assignees: Pak Chuen Chang, Muar (MY); Ryan You Wen Boey, Singapore (SG); Paulina Li Mei Chang, Singapore (SG)

( * ) Notice: Subject to any disclaimer, the term of this patent is extended or adjusted under 35 U.S.C. 154(b) by 149 days.

(21) Appl. No.: 18/566,323

(22) PCT Filed: May 25, 2022

(86) PCT No.: PCT/SG2022/050352
§ 371 (c)(1),
(2) Date: Dec. 1, 2023

(87) PCT Pub. No.: WO2022/271095
PCT Pub. Date: Dec. 29, 2022

(65) Prior Publication Data
US 2024/0260533 A1     Aug. 8, 2024

(30) Foreign Application Priority Data
Jun. 1, 2021   (SG) .............. 10202105805U (51) Int. Cl.
*A01K 1/00* (2006.01)
*A01G 9/24* (2006.01)

(52) U.S. Cl.
CPC ............ *A01K 1/0047* (2013.01); *A01G 9/246* (2013.01)

(58) Field of Classification Search
CPC ........ A01K 1/0047; A01G 9/246; F28D 5/00; F24F 5/0035; F24F 6/043
(Continued)

(56) References Cited

U.S. PATENT DOCUMENTS 3,680,327 A * 8/1972 Stein ..................... F25B 1/08
                                                    62/226
4,102,392 A * 7/1978 Schneider ............... F24F 3/00
                                                    62/309
(Continued)

FOREIGN PATENT DOCUMENTS

| CN | 103277852 A | 9/2013 |
| CN | 103292395 A | 9/2013 |

(Continued)

OTHER PUBLICATIONS

International Search Report and Written Opinion of the International Searching Authority in relation to International Application No. PCT/SG2022/050352, dated Feb. 15, 2023, 10 pages.

*Primary Examiner* — Jon T. Schermerhorn, Jr.
(74) *Attorney, Agent, or Firm* — Bochner PLLC; Andrew D. Bochner (57) ABSTRACT

The invention relates to an apparatus for simulating one or more eco habitat conditions. The apparatus includes at least one eco capsule unit and an air inlet chamber for receiving air. The eco capsule unit includes a pressurized water driven turbine, a low-pressure vacuum chamber, a pressurized humid air chamber, where the pressurized water driven turbine is configured to receive pressurized water to propel the pressurized water driven turbine, for generating a highly humidified air-water mixture and a pressurized humid air-water vapor by creating turbulence. The vacuum chamber is configured to enable a wind chill simulation and to remove heat from water for generating a water with reduced temperature by controlling the rate of evaporation of water. The (Continued)

pressurized humid air chamber is configured to capture the turbulence created water-pollutant mixture, highly humidified air-water mixture and the pressurized humid air-water vapor, to be expelled or recycled via an air blower or a humid air exhaust, for removing pollutants from the air to generate purified air with a desirable temperature.

14 Claims, 6 Drawing Sheets

(58) Field of Classification Search
USPC .......................................................... 165/50
See application file for complete search history.

(56) References Cited

U.S. PATENT DOCUMENTS

| | | | | |
|---|---|---|---|---|
| 4,201,062 A | * | 5/1980 | Martinez, Jr. | ........... F24F 5/001 62/305 |
| 5,349,829 A | * | 9/1994 | Tsimerman | ........... F24F 5/0035 261/153 |
| 5,386,872 A | * | 2/1995 | Chang | ....................... C10G 5/06 165/47 |
| 10,092,871 B2 | * | 10/2018 | Klein | ................. B01D 46/0002 |
| 2010/0281896 A1 | * | 11/2010 | Al Watban | ................ F28D 5/00 62/291 |

FOREIGN PATENT DOCUMENTS

| | | |
|---|---|---|
| CN | 203625416 U | 6/2014 |
| CN | 104613576 A | 5/2015 |
| CN | 105091164 A | 11/2015 |
| CN | 209696664 U | 11/2019 |
| CN | 209706229 U | 11/2019 |
| CN | 209944555 U | 1/2020 |
| KR | 102085298 B1 | 3/2020 |
| WO | 2017152268 A1 | 9/2017 |
| WO | 2019024451 A1 | 2/2019 |

* cited by examiner

602 — RECEIVE A PRESSURIZED WATER JET AND AIR FROM AN ENVIRONMENT EXTERNAL TO AN ECO CAPSULE UNIT

604 — PROPEL A PRESSURIZED WATER TURBINE BY THE PRESSURIZED WATER JET, TO CREATE AT LEAST ONE LOW PRESSURE VACUUM CHAMBER AND AT LEAST ONE PRESSURIZED CHAMBER SEPARATED BY THE PRESSURIZED WATER TURBINE AND CREATE A WATER TURBULENCE FOR MIXING UP WATER AND DUST IN THE AIR FOR CLEANING THE AIR FOR GENERATING A HIGHLY HUMIDIFIED AIR-VAPOR-POLLUTANT WATER DROPLET MIXTURE

606 — PERFORM AT LEAST ONE OF: A) ADJUSTING AIR AND WATER TEMPERATURES THROUGH AIR AND WATER HEAT EXCHANGE, BY THE AT LEAST ONE LOW PRESSURE VACUUM CHAMBER, CONFIGURED TO ENABLE AT LEAST ONE OR A COMBINATION OF: A WIND CHILL EFFECT SIMULATION, A RAIN EFFECT SIMULATION AND/OR EVAPORATIVE COOLING TO ENABLE AIR AND WATER HEAT EXCHANGE TO GENERATE A WATER WITH ADJUSTABLE TEMPERATURE, BY CONTROLLING A RATE OF EVAPORATION OF WATER AND A LEVEL OF WIND CHILL EFFECT SIMULATION; AND B) CAPTURING THE HIGHLY HUMIDIFIED AIR-VAPOR-POLLUTANT-WATER DROPLET MIXTURE CREATED FROM THE TURBULENCE IN THE AT LEAST ONE PRESSURIZED HUMID AIR CHAMBER FOR REMOVING POLLUTANTS ABSORBED INTO WATER DROPLETS FROM THE AIR TO GENERATE PURIFIED AIR WITH A DESIRABLE TEMPERATURE AND A PRESSURIZED HUMID AIR-WATER VAPOR

608 — PERFORM AT LEAST ONE OF: A) EXPELLING AND RECYCLING THE PRESSURIZED HUMID AIR-WATER VAPOR MIXTURE OR LATENT HEAT INTO AN ENVIRONMENT EXTERNAL TO THE APPARATUS, BY A HUMID AIR EXHAUST HEAT REMOVER COUPLED TO THE AT LEAST ONE PRESSURIZED HUMID AIR CHAMBER TO REGULATE HUMIDITY LEVELS IN THE ENVIRONMENT EXTERNAL TO THE APPARATUS AND B) DRYING THE PURIFIED AIR WITH DESIRABLE TEMPERATURE AND EXPELLING OR RECYCLING COOLER, DRIER, CLEANER AIR TO THE ENVIRONMENT EXTERNAL TO THE APPARATUS

FIG. 6

APPARATUS AND A METHOD FOR SIMULATING ONE OR MORE ECO HABITAT CONDITIONS

FIELD OF INVENTION

The present invention relates to eco habitat simulation. More particularly, the present invention relates to an apparatus and a method for simulating one or more eco habitat conditions.

BACKGROUND OF THE INVENTION

Currently, growing produce or farming privately on a small scale is dependent on ambient air and water temperatures, sunlight hours as well as local humidity and pollution levels. Also, costly greenhouses or commercial purpose fitted facilities are available to farm agriculture and fish outside their natural habitat/ecosystem. However, these facilities require multiple distinct and specific function equipment to achieve the overall desired habitat/climate conditions, for example a humidifier to regulate humidity, an air conditioner to regulate air temperature and an air purifier to clean the air, etc. Different equipment is needed to achieve different desired conditions. The specific function equipment employed within existing traditional systems such as greenhouses are usually single specific function and therefore are neither cost effective nor energy efficient. Furthermore, traditional solutions rely on refrigerant gases that can be detrimental to the environment.

Therefore, in light of the foregoing discussion, there exists a need to overcome the aforementioned drawbacks associated with conventional techniques and a need to provide a selectable multi-option habitat/climate simulation apparatus that can successfully achieve a selected set of desired conditions in a cost effective, energy efficient and environmentally friendly manner while employing one straightforward multi-option apparatus which works regardless of scale, adjusting not just air and water temperatures but also humidity and pollution levels to achieve the desired ecosystem conditions.

These and other objects and advantages of the present invention will become apparent to those skilled in the art from a consideration of the following specifications and claims.

SUMMARY OF THE INVENTION

According to an aspect of the present invention, there is provided an apparatus for simulating one or more eco habitat conditions. The apparatus comprises at least one eco capsule unit and an inlet chamber which can be at the base of the eco capsule unit for receiving air from an environment external to the apparatus. The at least one eco capsule unit comprises a pressurized water driven turbine to create at least one low pressure vacuum chamber and at least one pressurized humid air chamber separated by the pressurized water driven turbine, where the pressurized water driven turbine is configured to receive pressurized water from a recycle water sump and to receive air from an environment external to the apparatus via an air inlet chamber, creating turbulence for generating an air-vapor-pollutant-water droplet mixture. The at least one vacuum chamber is configured to enable at least one or a combination of: a wind chill simulation, a rain effect simulation and evaporative cooling, to enable air and water heat exchange, and to generate water with an adjustable temperature by controlling the rate of evaporation of water and the level of wind chill simulation. The at least one pressurized humid air chamber is configured to capture the highly humidified air-vapor-pollutant-water droplet mixture created from turbulence generated by the pressurized water driven turbine, for removing pollutants from the air absorbed into water droplets to generate purified air with a desirable temperature. The at least one eco capsule unit also includes a humid air exhaust heat remover coupled to the at least one pressurized humid air chamber for either one of: expelling or recycling the pressurized humid air-vapor mixture or latent heat into an environment external to the apparatus to regulate humidity levels in the environment external to the apparatus, or passing the pressurized humid air-vapor mixture or latent heat through a drying chamber such as a length of metal pipe with fins partially exposed to partial vacuum herein referred to as an air blower, for expelling or recycling cooler and drier air into the environment external to the apparatus. The air inlet chamber, usually at the base of the eco capsule, is configured for receiving air from an environment external to the eco capsule, said air can be supplied to the eco capsule unit via an ambient air inlet with wind chill effect simulation.

In an embodiment, the apparatus is setup to create one or more eco habitat conditions, comprising at least one of or a combination of, a wind-chill effect simulation, an evaporative cooling and/or rain effect simulation in each at least one eco capsule unit, to enable air and water heat exchange.

In an embodiment, the humid air exhaust heat remover comprises a dehumidifier tube or air-drying chamber such as a length of metal pipe with fins partially exposed to partial vacuum, herein referred to an air blower.

In an embodiment, the apparatus further comprises at least one vacuum chamber spacer for stacking two or more eco capsule units for improving performance of the apparatus.

In an embodiment, the recycle water sump comprises a water pump which can double up as a source of heat for selectively heating the water in the recycle water sump.

In an embodiment, the recycle water sump comprises an inlet vacuum cooling coil for selectively controlling the water temperature of the water in the recycle water sump.

In an embodiment, the recycle water sump further comprises an inlet volume control valve that creates a degree of vacuum by restricting an inlet-capacity of the water pump thereby creating a partial vacuum in the inlet vacuum cooling-coil, wherein by regulating the inlet volume the water-temperature in the recycle water sump is adjusted.

In an embodiment, the apparatus further comprises a plurality of valves as a means for users to manage the selection or adjustment of one or more eco habitat conditions.

In an embodiment, the apparatus further comprises a cooler water return discharge tube for discharging the water with adjusted temperature from the apparatus.

In an embodiment, the apparatus further comprises an ambient air inlet for simulating a wind chill effect.

In an embodiment, the apparatus further comprises an air-blower with at least one vapor-condenser or air dryer chamber for treating and then expelling or recycling the pressurized air-vapor into an environment external to the apparatus as cooler and drier cleaner air.

In an embodiment, the apparatus further comprises a humid air exhaust heat remover for expelling or recycling pressurized humid air-vapor or latent heat into an environment external to the apparatus.

In an embodiment, the humid air exhaust heat remover is coupled to a venturi device for recovering heat and vapor by bubbling into a water reservoir.

According to an aspect of the present invention, there is provided a method for simulating one or more eco habitat conditions employing only pressurized water as the primary driver. The method includes receiving a pressurized water jet and air from an environment external to an eco-capsule unit. The method also includes propelling a pressurized water driven turbine by pressurized water jet for creating at least one low pressure vacuum chamber and at least one pressurized humid air chamber, separated by the pressurized water driven turbine, and creating a turbulence for mixing up water, air and dust for generating a highly humidified air-vapor-pollutant-water droplet mixture. The method further includes performing at least one of: a) adjusting air and water temperatures through air and water heat exchange, by the at least one low pressure vacuum chamber, configured to enable at least one or a combination of: a wind chill effect simulation, a rain effect simulation and/or evaporative cooling to enable air and water heat exchange to generate a water with adjustable temperature, by controlling a rate of evaporation of water and a level of wind chill effect simulation and b) capturing the highly humidified air-vapor-pollutant-water droplet mixture created from the turbulence in the at least one pressurized humid air chamber for removing pollutants absorbed into water droplets from the air to generate purified air with a desirable temperature and a pressurized humid air-water vapor. The method furthermore includes performing at least one of: a) expelling and recycling the pressurized humid air-water vapor mixture or latent heat into an environment external to the apparatus, by a humid air exhaust heat remover coupled to the at least one pressurized humid air chamber to regulate humidity levels in the environment external to the apparatus and b) drying the purified air with desirable temperature and expelling or recycling cooler, drier, cleaner air to the environment external to the apparatus.

Various embodiments of the present invention provide an apparatus and a method for simulating one or more eco habitat conditions (selectable and multi-option) that can successfully achieve desirable eco habitat conditions in a cost effective, energy efficient and environmentally friendly manner and which works regardless of scale, adjusting not just air and water temperatures but also humidity and pollution levels to achieve the desired eco habitat conditions. The apparatus of the present technology can be calibrated for different habitat/climate conditions without costly retrofitting or changing equipment, for example the apparatus of the present technology can be utilized to either cool water or warm water as selected by the user thereby reducing costly changes of equipment when habitat/climate requirements change. Further, the apparatus is based on physics principles employing only pressurized water as its primary driver to achieve the selectable multi-option adjustment of temperature and/or humidity levels, along with cost and energy efficiency and in an environment friendly manner. Additionally, the apparatus of the present technology is cost effective because the design is straightforward, employing principles of physics in relation to water to eliminate costly complex components and is truly cost effective because it is multi-option selectable and therefore the one and same apparatus setup can be used to solve different habitat/climate condition challenges. Furthermore, the apparatus of the present technology requires much less energy to run compared with traditional methods employing multiple single specific function equipment. Moreover, the apparatus of the present technology is low maintenance because of its straightforward and efficient design centered primarily on pressurized water as the primary driver thereby reducing multi-equipment reliability issues and servicing costs. Also, unlike known systems such as greenhouses that require employing multiple specific function equipment, such as humidifiers, air conditioning units and air purifiers to achieve the desired climate conditions, the apparatus of the present technology can be used as a single system with multiple selectable options for various desired eco habitat conditions thereby enabling easy servicing and maintenance savings. Furthermore, the apparatus of the present technology is energy efficient because of its ingenious design based on principles of physics and is therefore inexpensive to maintain and sustain in the long term. Also, the apparatus of the present technology utilizes lower power that can be provided for by harnessing renewable energy such as solar therefore it is an attractive solution and opportunity for lower income households/economies. Furthermore, the method of the present technology is a sustainable and environmentally friendly method because primarily only pressurized water is used to drive the apparatus to achieve the eco habitat/climate conditions desired without the use of any harmful refrigerants or greenhouse gases. The apparatus of the present technology is a reliable method to simulate desired habitat/climate conditions regardless of time of year because it does not rely on external conditions such as hours of sunlight, ambient temperature and weather and also does not rely on the sun for heating nor the wind for cooling. Additionally, the apparatus of the present technology can be designed to be contained in an enclosure such as a capsule to make it portable. The method of the present technology is highly suitable to simulate selected habitat or climate conditions for agriculture, farming, research and hobbyists. Specific examples would be growing grapevines in the tropics, sustaining climate sensitive rainforest frogs or exotic orchids in temperate winters and this method can also achieve the delicate ideal water temperature balance between competing plants and fish requirements in an aquaponic system. Also, the method can be employed to simulate habitat on a small scale such as in a portable capsule or chamber, or on a larger scale such as a room or hall thereby creating specific eco habitat conditions of choice. Moreover, the method does not rely on refrigerant gases that can be detrimental to the environment or dedicated heating elements for temperature regulation thereby making it a cost effective, energy efficient and environmentally friendly method.

These and other aspects of the embodiments herein will be better appreciated and understood when considered in conjunction with the following descriptions and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

Other objects, features, and advantages of the invention will be apparent from the following descriptions when read with reference to the accompanying drawings. In the drawings, wherein like reference numerals denote corresponding parts throughout the several views:

FIG. 6 illustrates steps of a method for simulating one or more eco habitat conditions, in accordance with an embodiment of the present disclosure.

DETAILED DESCRIPTION OF THE PREFERRED EMBODIMENTS

In the following detailed description, numerous specific details are set forth in order to provide a thorough understanding of the invention. However, it will be understood by those of ordinary skill in the art that the invention may be practiced without these specific details. In other instances, well-known methods, procedures and/or components have not been described in detail so as not to obscure the invention. Reference will now be made in detail to the preferred embodiments of the present invention, examples of which are illustrated in the accompanying drawings. Various embodiments of the present invention provide an apparatus and a method for simulating one or more eco habitat conditions (selectable and multi-option) that can successfully achieve desirable eco habitat conditions in a cost effective, energy efficient and environmentally friendly manner and which works regardless of scale, adjusting not just air and water temperatures but also humidity and pollution levels to achieve the desired eco habitat conditions. The apparatus of the present technology can be calibrated for different habitat/climate conditions without costly retrofitting or changing equipment, for example the apparatus of the present technology can be utilized to either cool water or warm water as selected by the user thereby reducing costly changes of equipment when habitat/climate requirements change. Further, the apparatus is based on physics principles employing only pressurized water as its primary driver to achieve the selectable multi-option adjustment of temperature and/or humidity levels, along with cost and energy efficiency and in an environmentally friendly manner. Additionally, the apparatus of the present technology is cost effective because the design is straightforward, employing principles of physics in relation to water to eliminate costly complex components and is truly cost effective because it is multi-option selectable and therefore the one and same apparatus can be used to solve different habitat/climate condition challenges.

Furthermore, the apparatus of the present technology requires much less energy to run compared with traditional methods employing multiple single specific function equipment. Moreover, the apparatus of the present technology is low maintenance because of its straightforward and efficient design centered primarily on pressurized water thereby reducing reliability issues and servicing costs. Also, unlike known systems such as greenhouses that require employing multiple single specific function equipment, such as humidifiers, air conditioning units and air purifiers to achieve the desired climate conditions, the apparatus of the present technology can be used as a single system with multiple selectable options for various desired eco habitat conditions thereby enabling easy service and maintenance savings. Furthermore, the apparatus of the present technology is energy efficient because of its ingenious design based on principles of physics and is therefore inexpensive to maintain and sustain in the long term. Also, the apparatus of the present technology utilizes lower power that can be provided by harnessing renewable energy such as solar therefore it is an attractive solution and opportunity for lower income households/economics.

Furthermore, the method of the present technology is a sustainable and environmentally friendly method because primarily only pressurized water is used to drive the apparatus to achieve the eco habitat/climate conditions desired without the use of any harmful refrigerants or greenhouse gases. The apparatus of the present technology is a reliable method to simulate desired habitat/climate conditions regardless of time of year because it does not rely on external conditions such as hours of sunlight, ambient temperature and weather and also does not rely on the sun for heating nor the wind for cooling. Additionally, the apparatus of the present technology can be designed to be contained in an enclosure such as a capsule to make it portable. The method of the present technology is highly suitable to simulate selected habitat or climate conditions for agriculture, farming, research and hobbyists. Specific examples would be growing grapevines in the tropics, sustaining climate sensitive rainforest frogs or exotic orchids in temperate winters and the method can also achieve the delicate ideal water temperature balance between competing plants and fish requirements in an aquaponic system. Also, the method can be employed to simulate habitat on a small scale such as in a portable capsule or chamber or on a larger scale such as a room or hall thereby creating specific eco habitat conditions of choice. Moreover, the method does not rely on refrigerant gases that can be detrimental to the environment or dedicated and costly heating elements for temperature regulation thereby making it a cost effective, energy efficient and environmentally friendly method.

Figure 1:
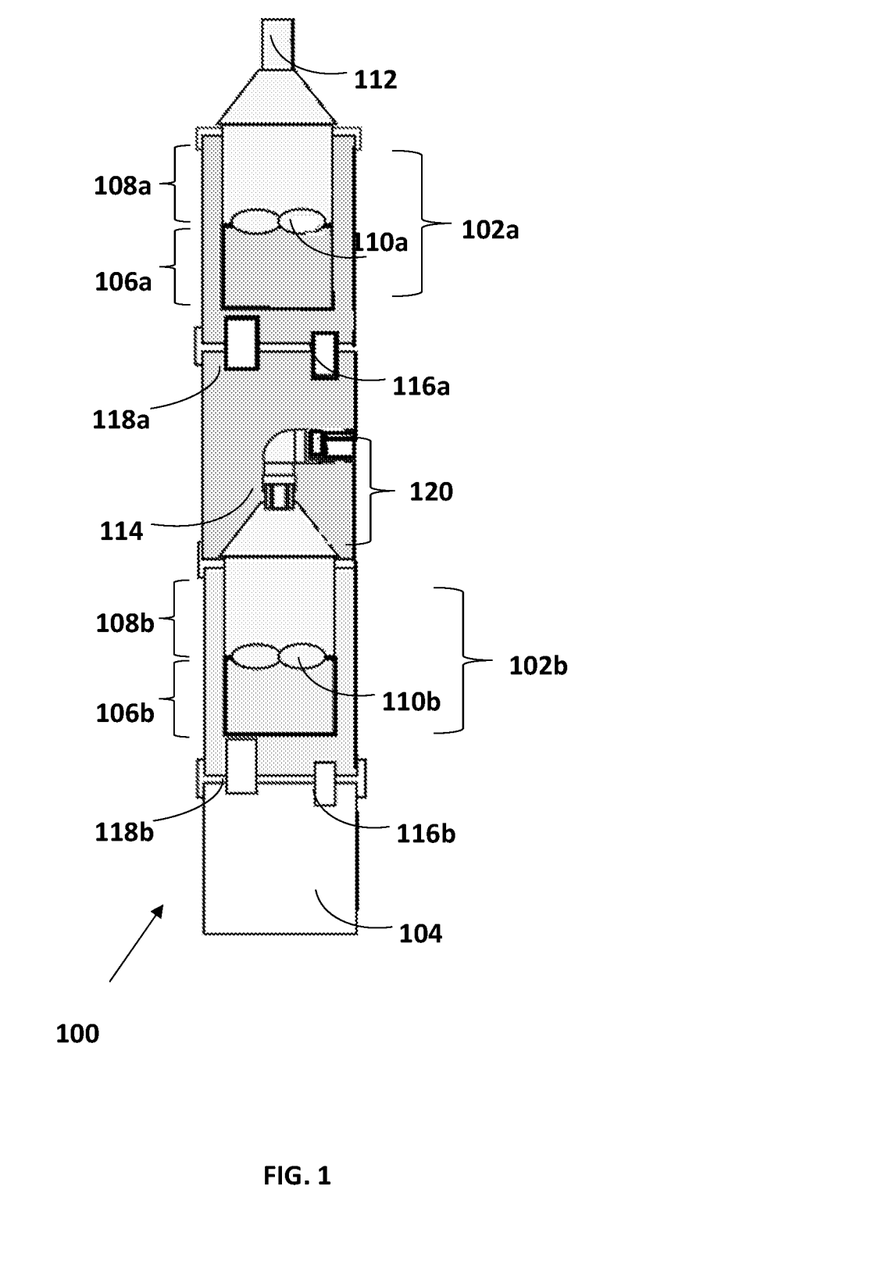
FIG. 1 depicts a vertical cross-sectional view of the apparatus for simulating one or more eco habitat conditions, in accordance with an embodiment.

With reference to FIG. 1, FIG. 1 depicts a vertical cross-sectional view of the apparatus for simulating one or more eco habitat conditions, in accordance with an embodiment. The term "eco habitat conditions" refers to one or more habitat conditions, for example air and water temperatures, humidity, and pollution levels, and the like. In an embodiment, the one or more eco habitat condition simulation apparatus comprises at least one or a combination of, a wind-chill effect simulation, an evaporative cooling, and a rain effect simulation in each at least one eco capsule unit 102*a-b*, to enable air and water heat exchange. The apparatus 100 for simulating one or more eco habitat conditions, includes at least one eco capsule unit 102*a-b* and an air inlet chamber 104 positioned in some embodiments at the base of the apparatus 100 for receiving air from an environment external to the apparatus 100.

The at least one eco capsule unit 102*a-b* comprises at least one low pressure vacuum chamber 106*a-b*, at least one pressurized humid air chamber 108*a-b* separated by a pressurized water driven turbine 110*a/b*, and coupled to either one of a humid air-vapor exhaust heat remover 112 or an air blower 120. The pressurized water driven turbine 110*a/b* is configured to receive pressurized water from a recycle water sump to drive the pressurized water driven turbine 110*a/b*, and to receive air from the air inlet chamber 104, creating turbulence for generating a highly humidified air-vapor-pollutant-water droplet mixture.

The at least one vacuum chamber 106a-b is configured to enable any one or a combination of, a wind chill simulation, a rain effect simulation and evaporative cooling, to enable air and water heat exchange, generating water with an adjustable temperature by controlling the rate of evaporation of water and the level of wind chill effect simulation. The vacuum chamber 106a-b is also configured to allow inlet of ambient air at a desired rate and water to be returned at an adjusted temperature from the apparatus 100.

The at least one pressurized humid air chamber 108a-b is configured to capture the highly humidified air-vapor-pollutant-water droplet mixture created from turbulence generated by the pressurized water driven turbine, for removing pollutants from the air which are absorbed into water droplets to generate purified air with a desirable temperature. The at least one pressurized humid air chamber 108a-b is also configured to allow air, vapor, water-droplets and pollutants to be mixed under pressure, pressurized humid air-vapor or latent heat to be expelled or recycled into an environment external to the apparatus 100 via a humid air exhaust heat remover 112, or pressurized humid air-vapor or latent heat to be recycled into an environment external to the apparatus 100 as cooler, drier cleaner air after passing through an air-drying chamber such as a length of metal pipe with fins partially exposed to partial vacuum herein referred to as an air blower 120.

The air inlet chamber 104 is configured for receiving air from an environment external to the apparatus 100, said air can be supplied to the eco capsule unit via an ambient air inlet 118a-b with wind chill effect simulation.

In an embodiment, the humid air-water vapor exhaust heat remover 112 comprises a dehumidifier tube or an air drier chamber such as a length of metal pipe with fins partially exposed to partial vacuum, herein referred to as an air blower 120.

In an embodiment, the apparatus 100 further comprises at least one vacuum chamber spacer 114 for stacking two or more eco capsule units 102a-b for improving performance of the apparatus 100. A plurality of eco capsule units may be stacked within the apparatus 100 using a plurality of vacuum chamber spacers 114.

In an embodiment, the recycle water sump comprises a submersible water pump, which can also be used in place of another as a source of heat, for selectively heating the water in the recycle water sump.

In an embodiment, the recycle water sump comprises an inlet vacuum cooling coil for selectively controlling the water temperature of the water in the recycle water sump.

In an embodiment, the recycle water sump further comprises an inlet volume control valve that creates a degree of vacuum by restricting an inlet-capacity of the water pump thereby creating a partial vacuum in the inlet vacuum cooling-coil, where by regulating the inlet volume the water-temperature in the recycle water sump is adjusted.

In an embodiment, the apparatus 100 further comprises a plurality of valves (not shown) as a means for users to manage the selection or adjustment of one or more eco habitat conditions.

In an embodiment, the apparatus 100 further comprises at least one cooler water return discharge tube 116a-b for discharging the water with reduced temperature from the apparatus 100.

In an embodiment, the apparatus 100 further comprises at least one ambient air inlet 118a-b which admits air into the apparatus and performs the added function of simulating a wind chill effect. As used herein the term "wind chill effect/wind chill simulation" refers to a perceived decrease in air temperature felt by a body due to the air speed, such that the greater the amount of airflow, the greater the cooling effect produced, air movement being one of the most effective methods to cool down an environment during the hot season.

In an embodiment, the apparatus 100 further comprises an air-blower 120 with at least one vapor-condenser or air dryer chamber for expelling the pressurized humid air-vapor into an environment external to the apparatus 100. The air-blower 120 expels cooler, cleaner, and less humid air from the apparatus 100.

Figure 2:
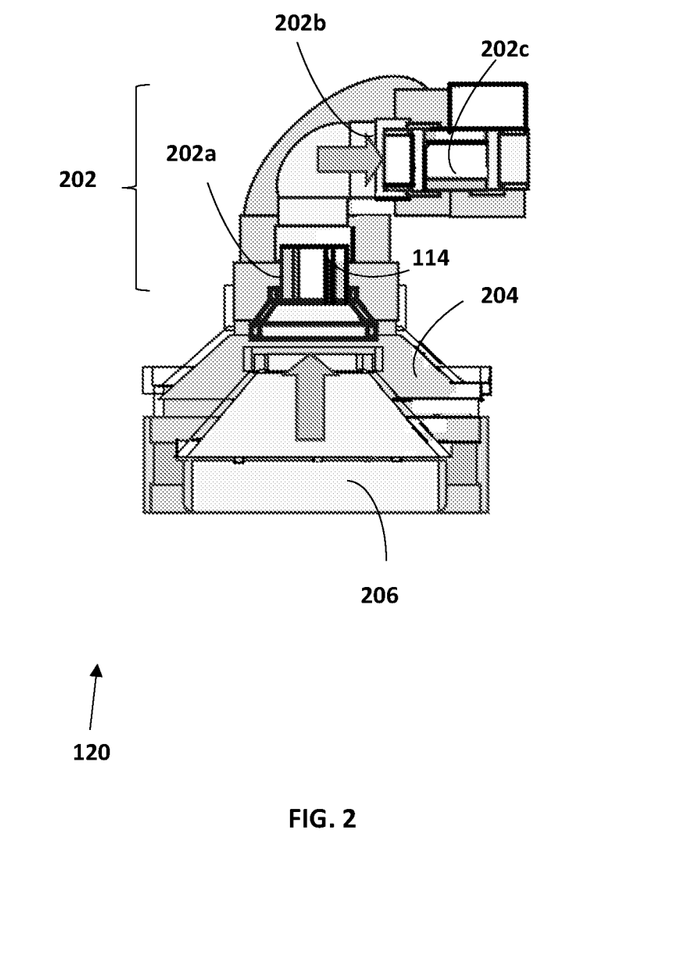
FIG. 2 depicts a vertical cross-sectional view of the air blower, in accordance with an embodiment.

FIG. 2 depicts a vertical cross-sectional view of the air blower 120, in accordance with an embodiment. The air blower 120 includes an aluminum pipe and fins which can be divided into three virtual zones, namely, a) an entry condensation-zone 202a, b) an expansion chill-zone 202b, and c) a condensation-zone 202c at exit. At the entry condensation zone 202a, the pressurized humid air-vapor-pollutant-water droplet mixture is condensed. In the expansion chill-zone 202b, the condensed pressurized humid air-vapor-water droplets evaporate to cool the pipe/fins. At the condensation zone at exit 202c, the cooler and drier air and the cooled water droplets are further condensed and cooled prior to being released out of the apparatus 100. The air blower 120 removes heat from the apparatus 100 in the form of air, moisture and water droplets. The air blower 120 enables cleaner, cooler and drier air to be recycled.

In an embodiment, the exhaust from humid air-vapor exhaust heat remover 112 can either be released into the open or room, expelled via an exhaust fan or channeled via a conduit into a venturi device for recovering heat and vapor by bubbling into a reservoir or a fish tank as warmer water before returning water to the recycle water sump.

Figure 3:
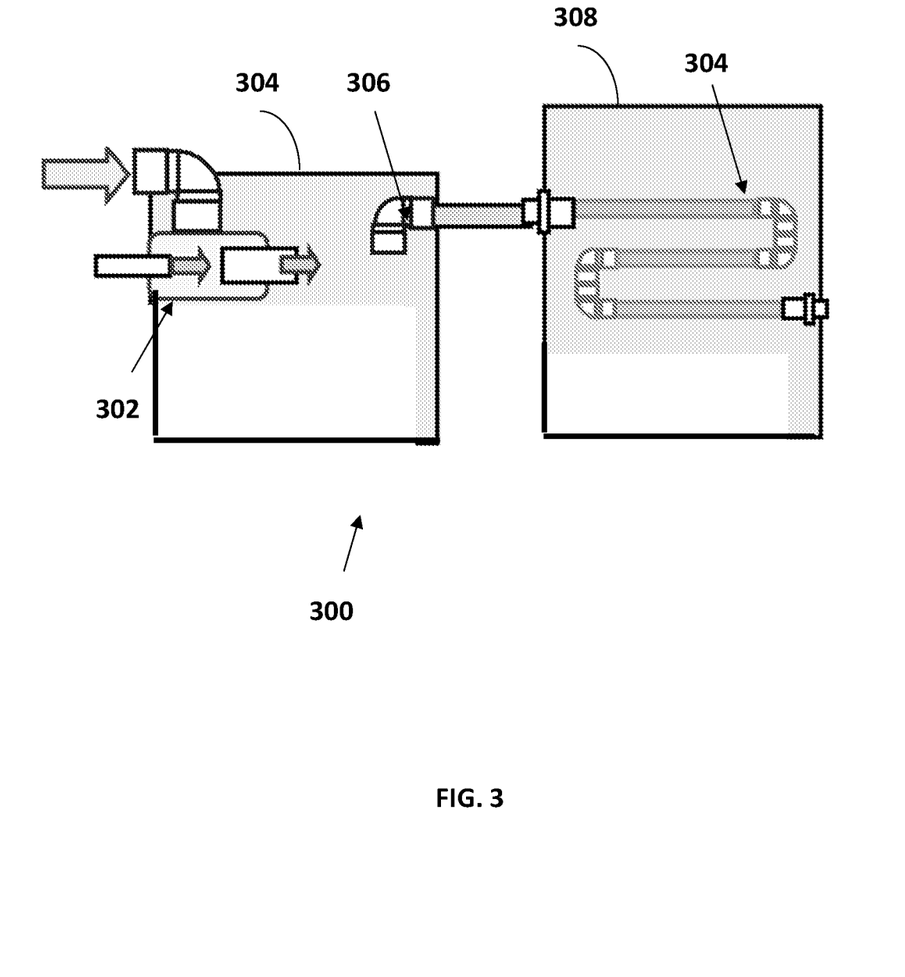
FIG. 3 depicts a cross-sectional view of a venturi device coupled to the humid air-vapor exhaust heat remover, in accordance with an embodiment.

FIG. 3 depicts a cross sectional view of a venturi device 300 coupled to the humid air exhaust heat remover 112, in accordance with an embodiment. As depicted in FIG. 3, the venturi device 300 comprises a venturi bubbler 302 in a heat recovery tank 304. The heat recovery tank 304 is coupled by means of a pipe 306 to a warm water utility tank 308. The pressurized water is fed into the venturi device 300 to suck-in the exhaust air and is subsequently bubbled into the heat-recovery tank 304 through the venturi bubbler 302 to warm the water. The warmer recovered water can be used to warm-up the warm water utility tank 308 before returning to a fish tank or the recycle water sump.

Figure 4:
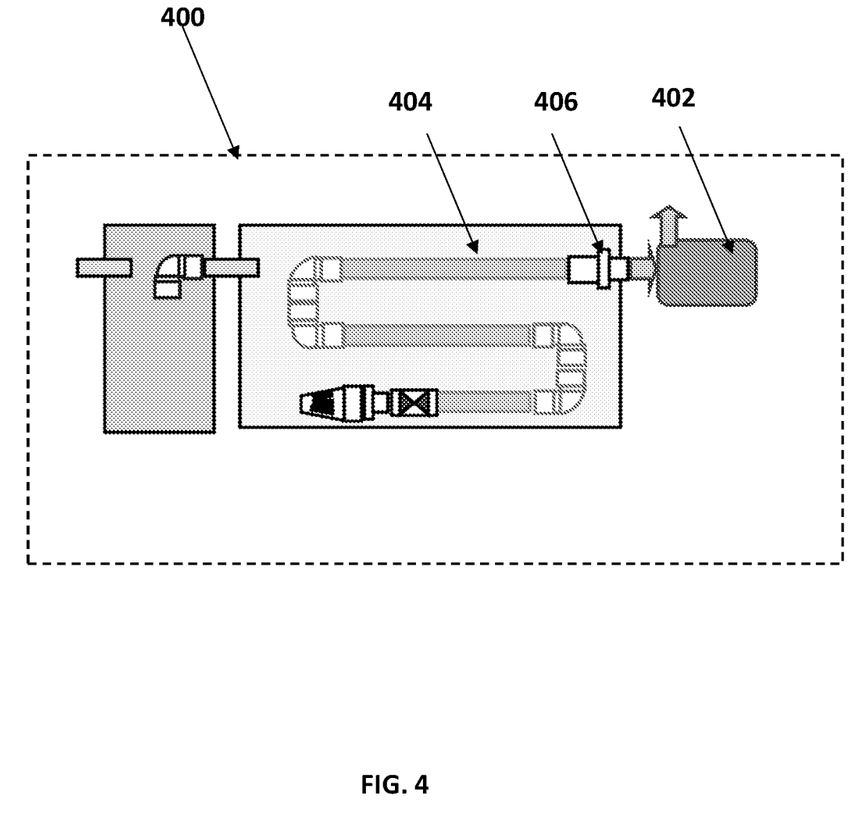
FIG. 4 depicts a cross-sectional view of a recycle water sump, in accordance with an embodiment.

FIG. 4 depicts a cross sectional view of a recycle water sump 400, in accordance with an embodiment. The recycle water sump 400 serves as a source of water for the apparatus 100. In an embodiment, the recycle water sump 400 comprises a water pump 402 which can also function additionally as a source of heat for selectively heating the water in the recycle water sump 400, an inlet vacuum cooling coil 404 for selectively controlling the water temperature of the water in the recycle water sump, and an inlet volume control valve 406 that creates a degree of vacuum by restricting an inlet-capacity of the water pump 402 thereby creating a partial vacuum in the inlet vacuum cooling-coil 404. By regulating the inlet volume, the water-temperature in the recycle water sump 400 is adjusted.

Figure 5:
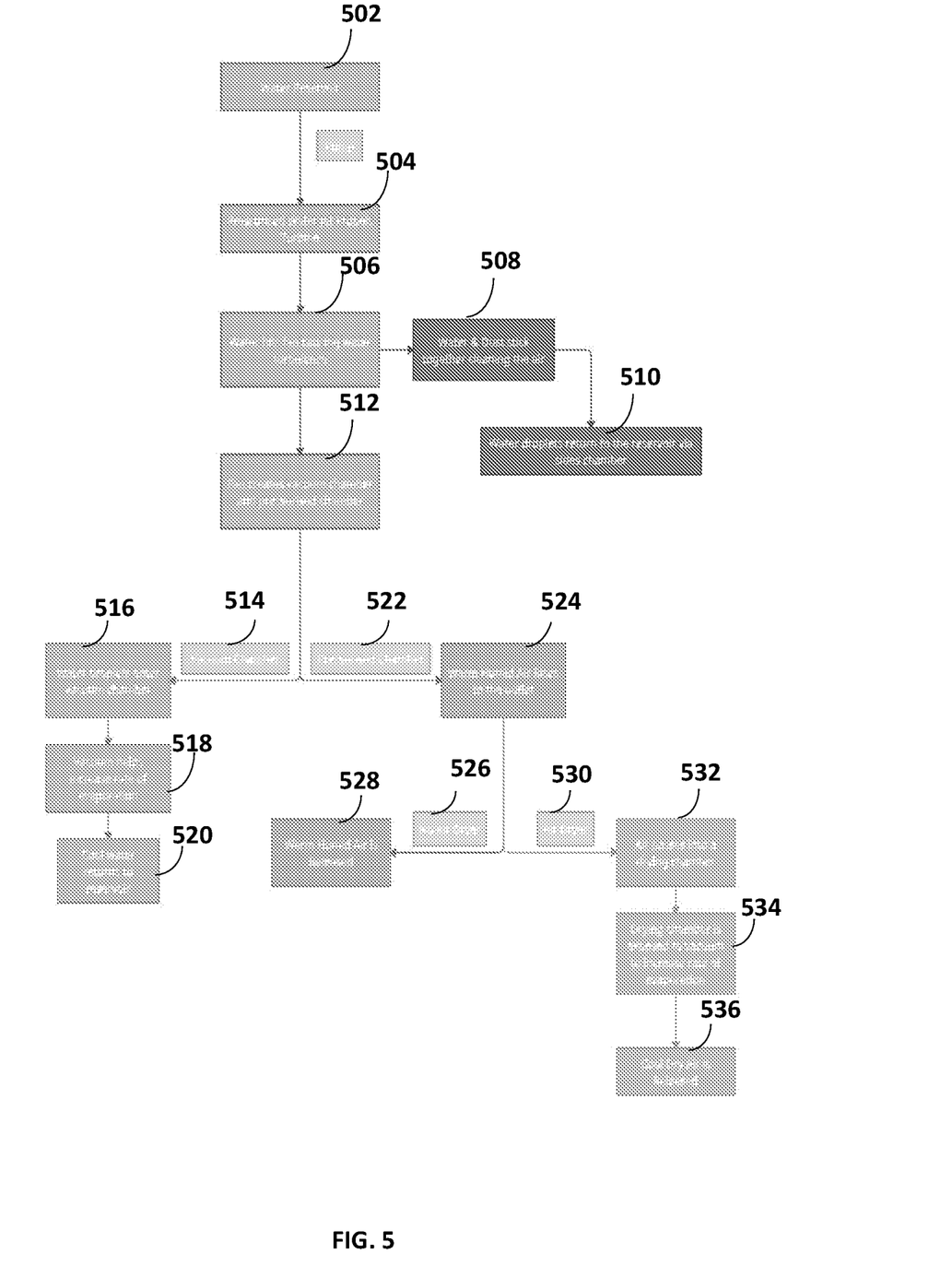
FIG. 5 is a process flow chart depicting the steps involved in the process of simulating one or more eco habitat conditions, in accordance with an embodiment.

FIG. 5 is a process flow chart depicting the steps involved in the process of simulating one or more eco habitat conditions, in accordance with an embodiment. At step 502, water from a water reservoir (recycle water sump) is pumped in to propel the pressurized water driven turbine. At step 504, the water (pressurized water jet) propels the pressurized water driven turbine. At step 506, water hits the fan of the pressurized turbine causing water turbulence. At step 508, water and dust stick together thereby cleaning the air inside the apparatus. At step 510, water droplets return to the water reservoir via sides of chamber. At step 512, the fan creates a low-pressure vacuum chamber and a pressurized humid air chamber. At step 514, the low-pressure vacuum chamber gets filled with the water droplets. At step 516, the water droplets enter the low-pressure vacuum chamber. At step 518, the vacuum helps increase rate of evaporation. At step 520, the cool water returns to the reservoir. At step 522, the pressurized humid air chamber gets filled with warm humid air. At step 524, the warm humid air rises to the outlet of the pressurized humid air chamber. In an embodiment at step 526, the air is not dried. At step 528, the warm humid air is released from the outlet. In an embodiment, at step 530, the warm humid air is dried. At step 532, the air passes into a drying chamber. At step 534, the drying chamber is exposed to vacuum to increase a rate of evaporation. At step 536, the cool dry air is released from the outlet.

FIG. 6 illustrates steps of a method for simulating one or more eco habitat conditions employing only pressurized water as the primary driver, in accordance with an embodiment of the present disclosure. At step 602, a pressurized water jet and air from an environment external to an eco-capsule unit is received. At step 604, a pressurized water driven turbine is propelled by the pressurized water jet, creating at least one low pressure vacuum chamber and at least one pressurized humid air chamber, separated by the pressurized water driven turbine, and creating a turbulence for mixing up water, air and dust for generating a highly humidified air-vapor-pollutant-water droplet mixture. At step 606, air and water temperatures is adjusted through air and water heat exchange, by the at least one low pressure vacuum chamber, configured to enable at least one or a combination of: a wind chill effect simulation, a rain effect simulation and/or evaporative cooling to enable air and water heat exchange to generate a water with adjustable temperature, by controlling a rate of evaporation of water and a level of wind chill effect simulation and/or the highly humidified air-vapor-pollutant-water droplet mixture created from the turbulence is captured in the at least one pressurized humid air chamber for removing pollutants absorbed into water droplets from the air to generate purified air with a desirable temperature and a pressurized humid air-water vapor At step 608, a) the pressurized humid air-water vapor mixture or latent heat is expelled and recycled into an environment external to the apparatus, by a humid air exhaust heat remover coupled to the at least one pressurized humid air chamber to regulate humidity levels in the environment external to the apparatus and/or the purified air is dried with desirable temperature and cooler, drier, cleaner air is expelled or recycled to the environment external to the apparatus. Various embodiments of the present technology tackle problems posed in the current world and enable the following scenarios in a cost effective, energy efficient and environmentally friendly solution which can be easily adapted for different sets of desired habitat/climate conditions without costly and time-consuming retrofitting or changes to specific function equipment. The apparatus and method of the present technology facilitates growing vegetation or plants in climates where they usually cannot be grown or thrive in (grapes in tropical climates and orchids in temperate winters as well as in deserts). The apparatus and method of the present technology facilitates reliable harvesting of crops and aquaculture all year round through systems such as aquaponics, and the like, given that the apparatus and method of the present technology does not rely on sunlight hours nor external ambient factors to regulate the habitat/climate conditions required, thereby making it applicable for use in challenging conditions such as arid deserts or frigid winters. The apparatus and method of the present technology facilitates creating and maintaining a delicate balance in Aquaponic systems where the ideal water temperature requirements of plants differ from the ideal water temperature requirements of fish and also enables fish, aquatic invertebrates which are habitat/climate sensitive to live in places they usually cannot thrive in. Further, the apparatus and method of the present technology facilitates simulating conditions for terrestrial animals/plants away from their natural habitat either on a small or large scale in different locations around the world. On a large scale this offers the potential to help simulate conditions for endangered animals to help increase their survival numbers as well as for research. Furthermore, the apparatus and method of the present technology facilitates research to be conducted in different places around the world regardless of local climate and time of year. Additionally, zoos can use the method to raise awareness for endangered animals by simulating conditions favorable to these endangered species outside their usual habitat. Also, the apparatus and method of the present technology facilitates creating mini ecosystems by managing the habitat/climate conditions of temperature, humidity and air quality in a room or defined space such as an Onsen room or rainforest shower room to fulfil the design purposes of landscape artists, interior designers and architects. Additionally, the apparatus and method of the present technology facilitates adjusting temperature and humidity to comfortable levels for living in places such as arid desert or alpine tundra locations. Moreover, the apparatus and method of the present technology facilitates cleaning the air in a room, area or enclosure as a standalone function or in combination with any of the other habitat/climate management scenarios, making it very useful for example when employed in air polluted cities. Also, the apparatus and method of the present technology facilitates creating cost effective, energy efficient, comfortable and desirable living conditions for low-income households for example, by providing cooler room air and warm shower water for indigenous jungle tribes in the tropics, and can also be employed in non-grid locations if solar energy is harnessed due to its energy efficient requirements.

As will be readily apparent to those skilled in the art, the present invention may easily be produced in other specific forms without departing from its essential characteristics. The present embodiments are, therefore, to be considered as merely illustrative and not restrictive, the scope of the invention being indicated by the claims rather than the foregoing description, and all changes which come within therefore intended to be embraced therein.

The invention claimed is:

1. An apparatus (100) for simulating one or more eco habitat conditions employing pressurized water as a primary driver, said apparatus (100) comprising:
   1) at least one eco capsule unit (102*a-b*) comprising:
      a pressurized water driven turbine to create (110*a-b*) at least one low pressure vacuum chamber (106*a-b*), at least one pressurized humid air chamber (108*a-b*) separated by the pressurized water driven turbine (110*a-b*), wherein the pressurized water driven turbine (110*a-b*) is configured to receive pressurized water from a recycle water sump (400) and to receive air from an air inlet chamber (104), for generating a highly humidified pressurized air-vapor-pollutant-water droplet mixture by creating a turbulence;

said at least one vacuum chamber (106a-b) configured to enable at least one or a combination of: a) a wind chill effect simulation, b) a rain effect simulation and c) an evaporative cooling to enable air and water heat exchange, generating water with an adjustable temperature by controlling the rate of evaporation of water and the level of wind chill effect simulation;

said at least one pressurized humid air chamber (108a-b) configured to capture the highly humidified pressurized air-vapor-pollutant-water droplet mixture created from the turbulence from the pressurized water driven turbine (110a-b), for removing pollutants from the air absorbed into water droplets to generate purified air with a desirable temperature and a pressurized humid air-vapor mixture, the at least one pressurized humid air chamber coupled to:

a humid air exhaust heat remover (112) for expelling or recycling the pressurized humid air-vapor mixture or latent heat, to regulate humidity levels in an environment external to the apparatus; and an air-blower (120) for expelling or recycling cooler and dryer air into an environment external to the apparatus, by passing the pressurized humid air vapor mixture through a length of metal pipe with fins partially exposed to a partial vacuum; and 2) said air inlet chamber (104) for receiving air from an environment external to the apparatus (100).

2. The apparatus (100) as claimed in claim 1, wherein one or more eco habitat conditions are simulated comprising a wind-chill effect simulation, an evaporative cooling, rain effect simulation in each at least one eco capsule unit, enabling air and water heat exchange.

3. The apparatus (100) as claimed in claim 1, wherein the humid air exhaust heat remover (112) is employed to expel or recycle pressurized humid air-vapor or latent heat to regulate humidity levels in an environment external to the apparatus (100).

4. The apparatus (100) as claimed in claim 1, further comprising at least one vacuum chamber spacer (114) for stacking two or more eco capsule units (120a-b) for improving performance of the apparatus (100).

5. The apparatus (100) as claimed in claim 1, wherein the recycle water sump (400) comprises a heating element as a source of heat for selectively heating the water in the recycle water sump (400), wherein the heating element comprises a submersible water pump (402).

6. The apparatus (100) as claimed in claim 1, wherein the recycle water sump (400) comprises an inlet vacuum cooling coil (404) for selectively controlling the water temperature of the water in the recycle water sump (400).

7. The apparatus (100) as claimed in claim 1, wherein the recycle water sump (400) further comprises an inlet volume control valve (406) that creates a degree of vacuum by restricting an inlet-capacity of the water pump (402) thereby creating a partial vacuum in the inlet vacuum cooling-coil (404), wherein by regulating the inlet volume the water-temperature in the recycle water sump (400) is adjusted.

8. The apparatus (100) as claimed in claim 1, further comprising a plurality of valves as a means for users to manage the selection or adjustment of one or more eco habitat conditions.

9. The apparatus (100) as claimed in claim 1, further comprising a cooler water return discharge tube (116a-b) for discharging the water with reduced temperature from the apparatus (100).

10. The apparatus (100) as claimed in claim 1, further comprising at least one ambient air inlet (118a-b) for simulating a wind chill effect.

11. The apparatus (100) as claimed in claim 1, wherein the air-blower (120) comprises at least one vapor-condenser or an air dryer chamber comprising a length of metal pipe with fins partially exposed to partial vacuum for expelling the pressurized humid air-vapor as cooler and drier cleaner air into an environment external to the apparatus (100).

12. The apparatus (100) as claimed in claim 1, wherein the humid air exhaust heat remover (112) is coupled to a venturi device (300) for recovering heat and vapor by bubbling into a water reservoir.

13. A method for simulating one or more eco habitat conditions employing pressurized water as the primary driver, said method comprising:

1) receiving (602) a pressurized water jet and air from an environment external to an eco-capsule unit;

2) said pressurized water jet propelling a pressurized water driven turbine, creating (604) at least one low pressure vacuum chamber and at least one pressurized humid air chamber, separated by the pressurized water driven turbine, and creating a turbulence for mixing up water, air and dust for generating a highly humidified air-vapor-pollutant-water droplet mixture;

3) performing (606) at least one of:
   a) adjusting air and water temperatures through air and water heat exchange, by the at least one low pressure vacuum chamber, configured to enable at least one or a combination of: a wind chill effect simulation, a rain effect simulation and/or evaporative cooling to enable air and water heat exchange to generate a water with adjustable temperature, by controlling a rate of evaporation of water and a level of wind chill effect simulation; and
   b) capturing the highly humidified air-vapor-pollutant-water droplet mixture created from the turbulence in the at least one pressurized humid air chamber for removing pollutants absorbed into water droplets from the air, via an air-blower comprising at least one vapor-condenser, to generate purified air with a desirable temperature and a pressurized humid air-water vapor; and 4) performing (608) at least one of:
   a) expelling and recycling the pressurized humid air-water vapor mixture or latent heat into an environment external to the apparatus, by a humid air exhaust heat remover coupled to the at least one pressurized humid air chamber to regulate humidity levels in the environment external to the apparatus; and
   b) drying the purified air with desirable temperature and expelling or recycling cooler, drier, cleaner air to the environment external to the apparatus.

14. The method as claimed in claim 13, wherein subjecting the air for drying comprising:

passing the purified air into a drying chamber, wherein the drying chamber comprises a metal pipe with a plurality of fins along a length of the metal pipe;

exposing the air to partial vacuum to increase a rate of evaporation to generate cooler drier air; and releasing the cooler drier air to the environment external to the apparatus.

* * * * *